(12) United States Patent
Lu et al.

(10) Patent No.: US 10,099,625 B1
(45) Date of Patent: Oct. 16, 2018

(54) GLOVE BOX BIN WITH ADJUSTABLE STIFFNESS

(71) Applicant: FORD GLOBAL TECHNOLOGIES, LLC, Dearborn, MI (US)

(72) Inventors: Li Lu, Bloomfield Hills, MI (US); Jeffrey Kloberdanz, Royal Oak, MI (US); Yi Yang Tay, Plymouth, MI (US); Gary D. Mullen, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 9 days.

(21) Appl. No.: 15/629,917

(22) Filed: Jun. 22, 2017

(51) Int. Cl.
| | |
|---|---|
| *B60R 7/06* | (2006.01) |
| *B60R 21/00* | (2006.01) |
| *B29C 45/00* | (2006.01) |
| *B29C 45/16* | (2006.01) |
| *B29L 31/30* | (2006.01) |
| *B29K 23/00* | (2006.01) |
| *B29K 21/00* | (2006.01) |

(52) U.S. Cl.
CPC ............ *B60R 7/06* (2013.01); *B29C 45/0001* (2013.01); *B29C 45/1628* (2013.01); *B29K 2021/003* (2013.01); *B29K 2023/06* (2013.01); *B29K 2023/12* (2013.01); *B29L 2031/3005* (2013.01); *B60R 2021/0051* (2013.01)

(58) Field of Classification Search
CPC ............... B60R 7/06; B60R 2011/0005; B60R 2021/0051; B29C 45/0001; B29C 45/1628; B29K 2021/003; B29K 2023/06; B29K 2023/12; B29L 2031/3005

USPC ................ 296/187.05, 37.8, 37.12; 280/752
See application file for complete search history.

(56) References Cited

U.S. PATENT DOCUMENTS

| | | | | |
|---|---|---|---|---|
| 7,331,606 | B2 * | 2/2008 | Riefe | .................... B60R 21/045 280/751 |
| 7,874,587 | B2 | 1/2011 | Miki et al. | |
| 8,118,348 | B2 * | 2/2012 | Taracko | .................... B60R 7/06 296/187.05 |
| 8,882,144 | B2 * | 11/2014 | Takai | .................... B60R 21/045 280/748 |
| 9,248,798 | B2 | 2/2016 | Roychoudhury | |
| 9,522,646 | B2 | 12/2016 | Tamada et al. | |
| 2003/0129418 | A1 * | 7/2003 | Tamura | .................... B60R 7/06 428/432 |

(Continued)

*Primary Examiner* — Gregory A Blankenship
(74) *Attorney, Agent, or Firm* — Vichit Chea; MacMillan, Sobanski & Todd, LLC

(57) ABSTRACT

A vehicular glove box bin has a molded substrate of a first durometer plastic material defining a concave body with bin sides, bottom, and open mouth. The sides include a front wall arranged to receive an impact load in a substantially normal direction, and at least one perforated wall substantially aligned with the normal direction which has at least one stiffness reducing gap. A substitution panel comprising a resilient material having a second durometer less than the first durometer is molded into and closes the gap. The gap and the substitution panel define locking surfaces for retaining the substitution panel. The combined first and second durometers provide a predetermined collapse in response to the impact load. The placement and sizes of gaps together with the selected durometers allow a designer to tailor the stiffness around various portions of the bin to match a desired impact performance.

20 Claims, 5 Drawing Sheets

(56) References Cited

U.S. PATENT DOCUMENTS

| | | |
|---|---|---|
| 2004/0124623 A1 | 7/2004 | Yamazaki |
| 2006/0038390 A1* | 2/2006 | Cho ................... B60R 21/045 |
| | | 280/752 |
| 2007/0182145 A1 | 8/2007 | Penner |
| 2009/0020993 A1* | 1/2009 | Cappabianca ........ B60R 21/045 |
| | | 280/752 |
| 2012/0126563 A1* | 5/2012 | Kuwano ................... B60R 7/06 |
| | | 296/37.12 |
| 2017/0015358 A1 | 1/2017 | Jindal et al. |

* cited by examiner

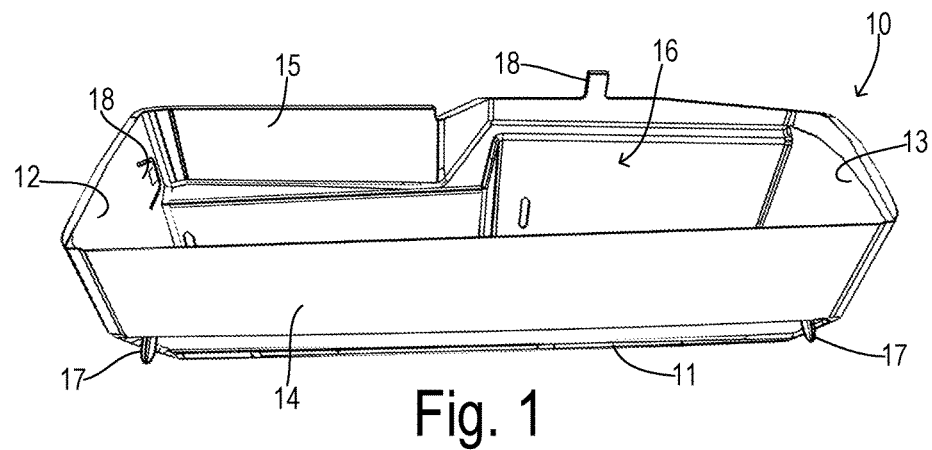
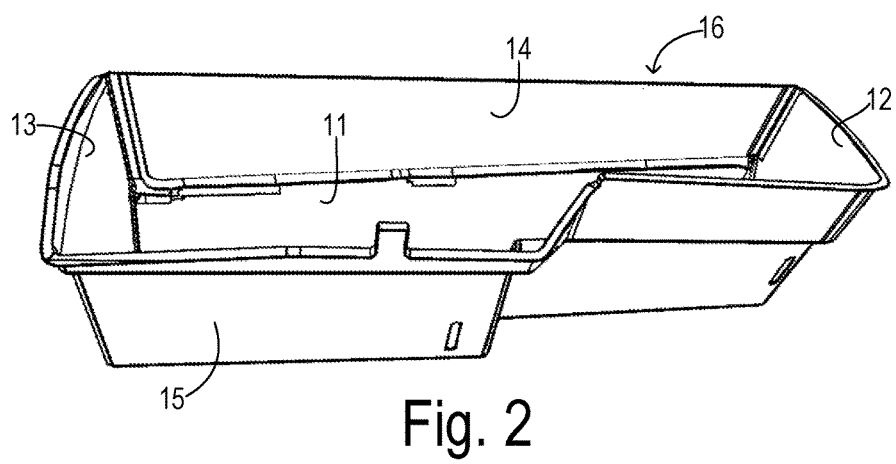
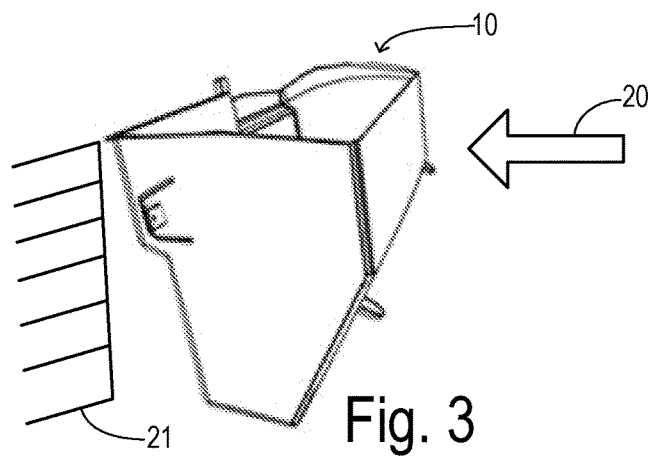

GLOVE BOX BIN WITH ADJUSTABLE STIFFNESS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to storage bins in instrument panels of automotive vehicles, and, more specifically, to a bin construction that enables the stiffness of the bin in response to crushing forces from an impact load to be easily adjusted to a desired stiffness without comprising the overall size, appearance, or performance of the main body of the bin.

A glove box storage bin is commonly installed in automotive vehicles by placing it in the instrument panel (i.e., dashboard) in front of the front passenger seat. Usually mounted to a hinged and latchable door, the bin is within easy reach of the vehicle occupants. Because of the placement immediately in front of a passenger locations, the design of a bin must take into account its interaction with passengers in the event of a vehicle crash.

Close proximity of the glove box to the knees of a passenger dictates that it have a low dynamic stiffness in order to achieve a desired level of knee impact safety. In particular, the stiffness should be low enough to permit the bin to begin to crush in response to knee impacts against the bin depending on the magnitude of the impact load force. In a typical design process, an approximate bin configuration is derived from a rough vehicle layout. A prototype part is fabricated and then tested under various impacts to determine whether the stiffness is within a desired range. Usually, multiple design iterations are required with an evolving shape to adjust the stiffness of the glove box until the target knee loads are achieved for the tested knee impacts. Some existing methods for tweaking a design to reduce stiffness in a particular design include removing or trimming support ribs, adding open slots through the walls of the bin, and reducing the wall thickness of the bin. These known tactics have had certain disadvantages such as warping or sagging of thin walls, undesirable aesthetic appearance of open slots, and the possibility of slots interfering with the bin contents or even the possibility of contents falling out through the slots.

SUMMARY OF THE INVENTION

In one aspect of the invention, a vehicular glove box bin has a molded substrate comprised of a first durometer plastic material having a concave body with bin sides, a bin bottom, and an open mouth. The sides include a front wall arranged to receive an impact load in a substantially normal direction, and the sides include at least one perforated wall substantially aligned with the normal direction which has at least one stiffness reducing gap. A substitution panel comprising a resilient material having a second durometer less than the first durometer is molded into and closes the gap. The gap and the substitution panel define locking surfaces for retaining the substitution panel. The combined first and second durometers provide a predetermined collapse in response to the impact load. The placement and sizes of gaps together with the selected durometers allow a designer to tailor the stiffness around various portions of the bin to match a desired impact performance while maintaining an appearance and overall structural integrity needed to meet customer expectations.

BRIEF DESCRIPTION OF THE DRAWINGS

FIGS. 1 and 2 are front and back perspective views, respectively, of a conventional glove box bin.

FIG. 3 is a diagram illustrating impact loads that may be applied to the bin during a crash event.

DETAILED DESCRIPTION OF PREFERRED EMBODIMENTS

Figure 4:
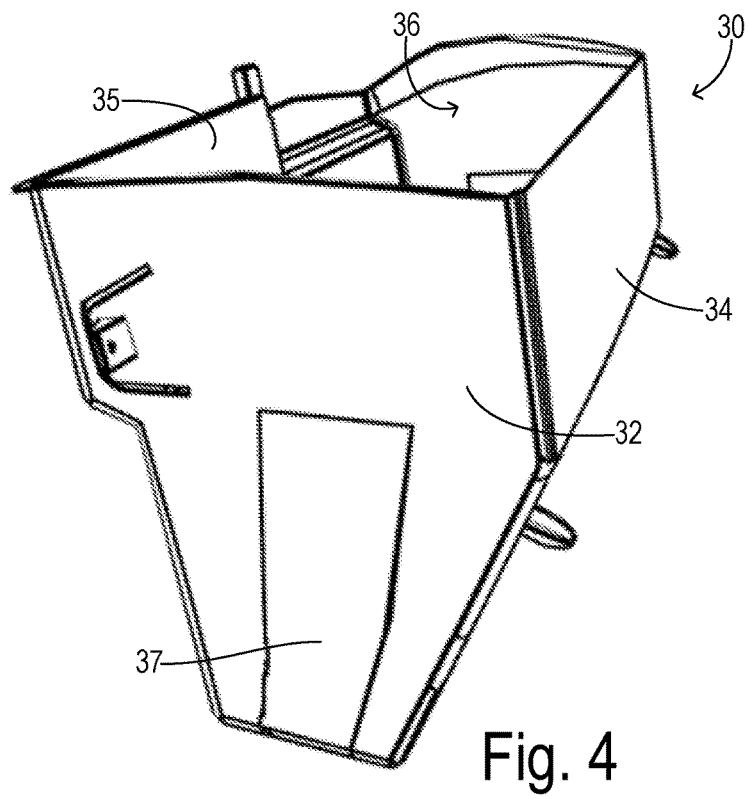
FIGS. 4 and 5 are left-side and top perspective views, respectively, of an improved bin of the present invention wherein substitution panels formed of a lower durometer material are strategically inserted into the bin walls to reduce overall stiffness and to provide a predetermined collapse when subjected to predetermined impact loads.

Referring to FIG. 1, a glove box bin 10 has a bottom 11, left and right sides 12 and 13, and front and back sides 14 and 15, all defining an open mouth 16. Bin 10 is typically formed by injection molding of a suitable thermoplastic such as thermoplastic polyolefin (TPO). Locator posts 17 may be provided at front side 14 to assist in attaching an outer glovebox door trim panel, for example. Other features such as side and top bumpers 18 and a mounting hinge (not shown) provide a desired pivotal movement and retention of the bin 10 within a corresponding opening in a vehicle instrument panel.

During a front end collision event, a front seat occupant may be propelled forward toward the instrument panel (or the instrument panel may be driven back toward the occupant). As a result of a glovebox position being directly forward of the occupant, their knees may impact the glovebox. FIG. 3 shows an impact load 20 which may impinge to the door (not shown) which pushes bin 10 against a relatively fixed support structure 21 which may include a crosscar beam, for example. To soften the reaction forces against the impacting passenger's knees, the stiffness of bin 10 is made sufficiently low that an appropriate level of crushing of bin 10 occurs whenever a high enough impact load is applied.

In order to maintain sufficient structural integrity to function as a storage bin, and to maintain long-term durability, it is desirable to utilize a relatively strong plastic material when molding bin 10. Thus, a difficult trade-off has existed between bin strength and its crushability which has been resolved using significant design effort and testing in order to achieve a fully functional design. Changes in the bin wall size, shapes, and thickness, together with the addition or deletion of empirically derived strengthening ribs or weakening slots have been iteratively used to create testing samples for testing. This trial and error approach to designing a bin results in a slow and costly process.

Figure 5:
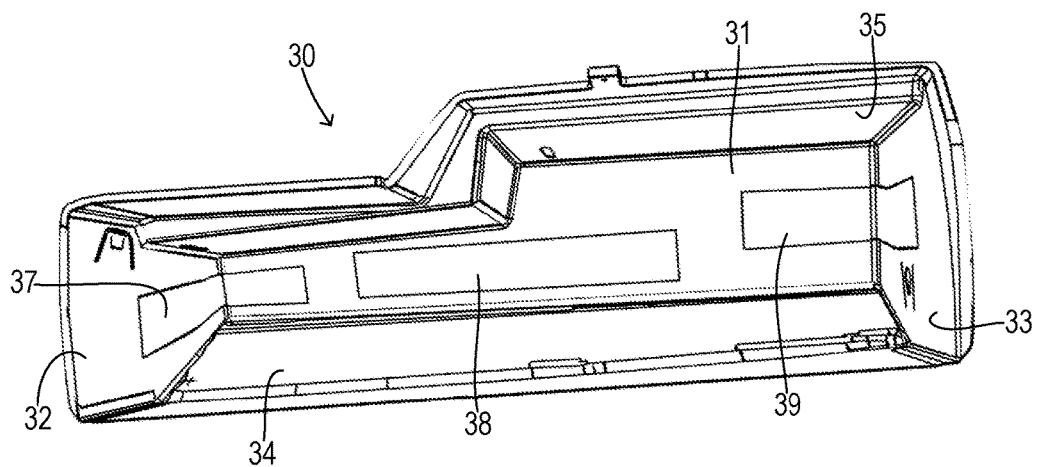
Figure 6:
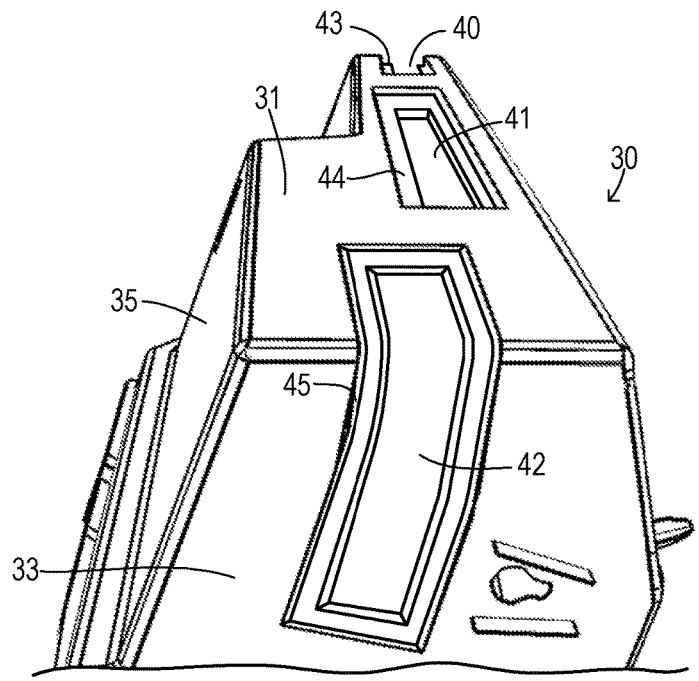
FIG. 6 is a side perspective view of a bin substrate formed during a first molding step, showing shaped locking surfaces that cooperate with surfaces on the substitution panels to provide positive retention of the panels.

The present invention provides a composite glove box bin wherein portions of the bin walls may be strategically replaced by substitution panels having a lower durometer (i.e., more flexible) material. FIGS. 4-6 show a composite bin 30 having a bottom 31, lateral left and right sides 32 and 33, and front and back sides 34 and 35, all defining an open mouth 36. The primary resistance to overcome when crushing bin 30 derives from the bin walls that extend in a direction that is aligned with the impact load. At least one of these walls is perforated to create at least one stiffness reducing gap, and a substitution panel is placed into each gap.

The impact load is applied in a substantially normal (i.e., perpendicular) direction to front side 34. The walls that are substantially aligned with the impact load, therefore, are the walls that are likewise substantially normal to front side 34, namely, bottom 31 and left-right lateral sides 32 and 33. Thus, substitution panels 37, 38, and 39 shown in FIGS. 4 and 5 are molded into respective stiffness-reducing gaps 40, 41, and 42 shown in FIG. 6. Panels 37-39 are preferably formed by overmolding a soft material (e.g., rubber) in order to maintain the stiffness reduction introduced by gaps 40-42. The soft rubber material may be comprised of a known thermoplastic elastomer (TPE) and may preferably by vulcanized (e.g., TPV). The main substrate body forming the walls around the gaps is preferably molded using a base material such as TPO or other polypropylene, selected to have a higher durometer than the soft rubber material. With this construction, the stiffness of the bin can be easily adjusted by fine-tuning the size and placement of the gaps and the relative durometer of the material used for the substitution panels.

In order to positively retain substitution panels 37-39 in gaps 40-42, the interface between a substitution panel and its respective gap define locking surfaces for mechanically holding the panels in place. As shown in FIG. 6, the locking surfaces may be comprised of a tongue and groove arrangement, with tongues 43-45 extending along an inner periphery of each respective gap. When the substitution panels are overmolded within the gaps, they each form a matching groove along their outer edges to receive each tongue.

Figure 7A:
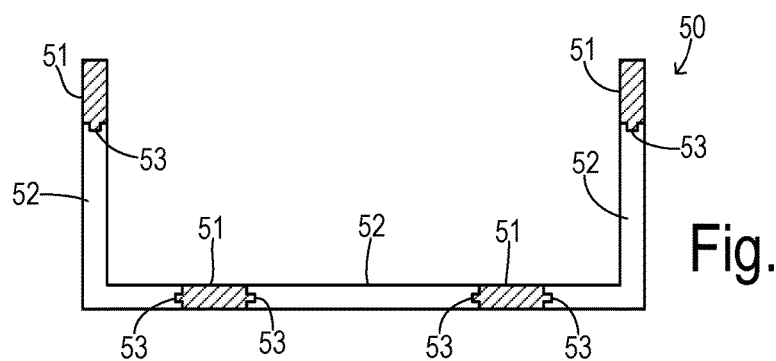
FIGS. 7A and 7B are cross-sectional views showing a first shot and a second shot, respectively, for molding the bin with stiffness reducing gaps filled by substitution panels.
Figure 7B:
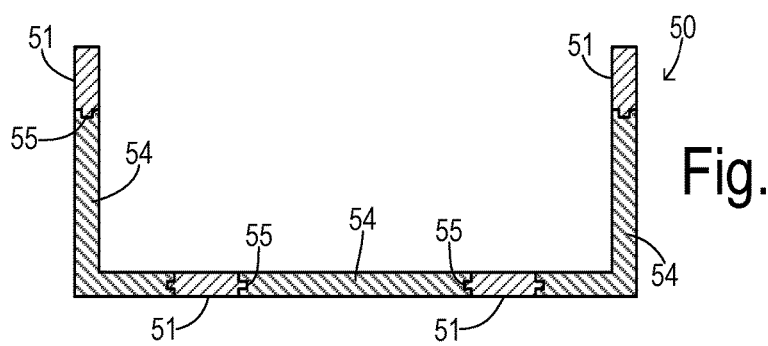

A two shot molding of the invention is illustrated in FIGS. 7A and 7B representing a glove box bin 50 seen in cross section through the lateral sides and bottom. In a first shot, a main substrate 51 is injection molded using a plastic material having a first durometer into a concave body. Each of the sides shown is molded to comprise a perforated wall by including stiffness reducing gaps 52. The periphery of each gap 52 has a tongue 53 extending inwardly to form a flange. In a second shot shown in FIG. 7B, a substitution panel 54 is overmolded into each gap 52 using injection molding of a resilient material having a second durometer less than the first durometer into and closing gaps 52. By overmolding tongues 53, a groove 55 is formed along the outer edges of substitution panels 54 so that they are prevented from falling out from the gaps. As a result of the relative sizes and placement of gaps 52 and panels 54, the combined first and second durometers provide a predetermined collapse of bin 50 in response to the impact load. For example, in bins fabricated using TPO for the substrate, the introduction of substitution panels made of TPV have reduced the overall bin stiffness by 44% without introducing any problematic holes through the bin. The resulting change in stiffness that results from proposed changes in a window size for a substitution panel can be more easily predicted using computer modeling, thereby reducing the reliance on trial and error for a bin design. Furthermore, a pleasing styling appearance can be obtained by introducing contrasting color schemes for the substitution panels.

The two shot molding can be accomplished using "Pick and Place Insert" molding equipment. More preferably, the invention utilizes a Rotary mold wherein a core plate rotates after each shot, thereby completing an overmold process in two cycles.

Figure 8:
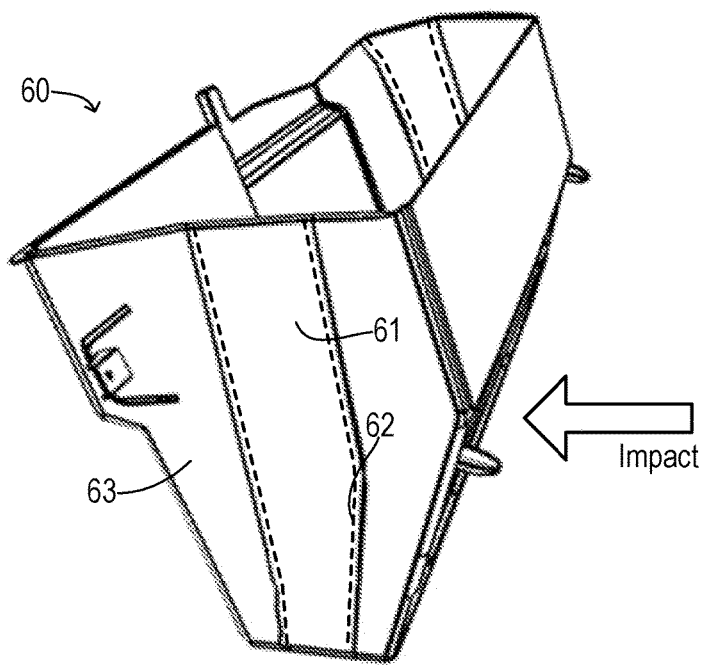
FIGS. 8 and 9 are side and bottom perspective views, respectively, showing an alternative embodiment for placement of the substitution panels.
Figure 9:
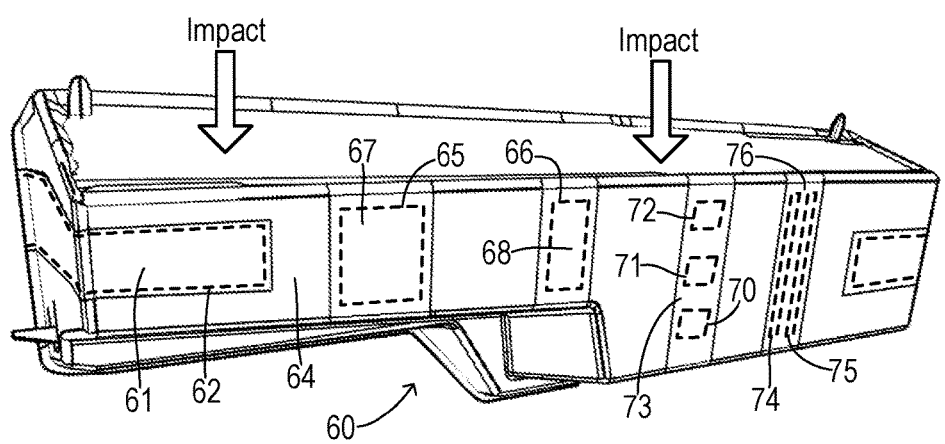

FIGS. 8 and 9 illustrate an alternative configuration for the substitution panels. In particular, a bin 60 has a substitution panel 61 residing in a stiffness-reducing gap 62. Panel 61/gap 62 extend within both a lateral side wall 63 and a bottom wall 64. Bottom wall 64 also contains gaps 65 and 66 which are filled by substitution panels 67 and 68, respectively. A series of gaps 70, 71, and 72 are spaced along a line which is aligned with the impact direction, and they are filled by a substitution panel 73 which extends continuously across bottom wall 64. A pair of elongated gaps 74 and 75 in bottom wall 64 extend side-by-side in the impact direction, and they are filled by a substitution panel 76. Each arrangement may have a distinct impact on the change in stiffness, and can be used to more easily customize the performance of any particular glove box bin.

Figure 10A:
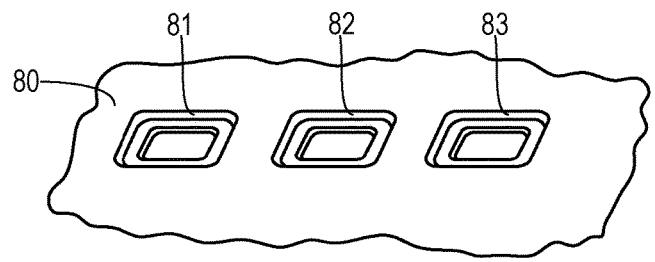
FIGS. 10A and 10B show a portion of a perforated well before and after the overmolding of the substitution panels, respectively.
Figure 10B:
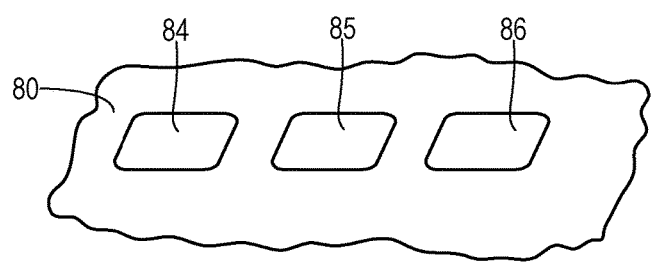

Other alternatives are shown in FIGS. 10 and 11. FIG. 10A shows a perforated wall 80 having gaps or apertures 81, 82, and 83 for reducing the stiffness of wall 80 as measured for forces applied along the plane of wall 80. Each gap 81-83 includes a locking surface comprised of a tongue extending into each gap along its inner periphery. FIG. 10B shows overmolded substitution walls 84, 85, and 86 formed by a second shot of a soft rubber material.

Figure 11A:
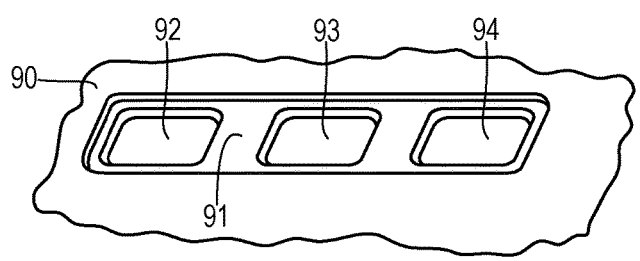
FIGS. 11A and 11B show an alternative embodiment of a portion of a perforated well before and after the overmolding of a substitution panel, respectively.
Figure 11B:
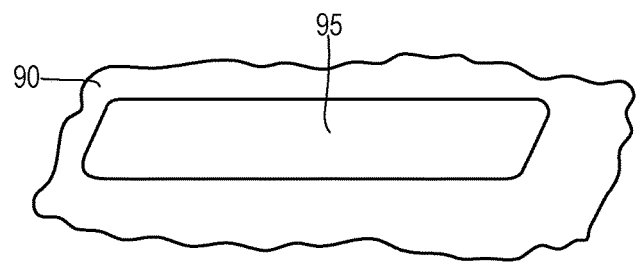

In FIG. 11A, a perforated wall 90 has gaps or apertures 92, 93, and 94 wherein a common locking surface 91 is formed as an inner flange surrounding gaps 92, 93, and 94. FIG. 11B shows a single substitution wall 95 which overmolds locking flange surface 91 and fills all of gaps 92, 93, and 94.

What is claimed is:

1. A vehicular glove box bin, comprising:
   a molded substrate comprised of a first durometer plastic material having a concave body with bin sides, a bin bottom, and an open mouth, wherein the sides include a front wall arranged to receive an impact load in a substantially normal direction, and wherein the sides include at least one perforated wall substantially aligned with the normal direction which has at least one stiffness reducing gap; and
   a substitution panel comprising a resilient material having a second durometer less than the first durometer which is molded into and closes the gap, wherein the gap and the substitution panel define locking surfaces for retaining the substitution panel, and wherein the combined first and second durometers provide a predetermined collapse in response to the impact load.

2. The glove box bin of claim 1 wherein the perforated wall is located at a lateral side extending transversely from the front wall.

3. The glove box bin of claim 1 wherein the perforated wall is located at the bin bottom extending transversely from the front wall.

4. The glove box bin of claim 1 wherein the sides include opposite lateral sides which are each a perforated wall extending transversely from the front wall, and wherein the bin bottom is a perforated wall extending transversely from the front wall.

5. The glove box bin of claim 1 wherein the locking surfaces comprise a tongue and groove arrangement wherein the substrate includes a tongue extending along an inner periphery of the gap, and wherein a matching groove is formed by overmolding an outer edge of the substitution panel onto the tongue.

6. The glove box bin of claim 1 wherein the first durometer plastic material is comprised of thermoplastic polyolefin.

7. The glove box bin of claim 1 wherein the first durometer plastic material is comprised of thermoplastic polypropylene.

8. The glove box bin of claim 1 wherein the resilient material is a thermoplastic copolymer.

9. The glove box bin of claim 8 wherein the resilient material is vulcanized.

10. The glove box bin of claim 1 wherein the first plastic material and the resilient material are pigmented to provide a color contrast.

11. A method of manufacturing a vehicular glove box bin, comprising the steps of:
in a first shot, injection molding a substrate using a plastic material having a first durometer into a concave body with bin sides, a bin bottom, and an open mouth, wherein the sides include a front wall arranged to receive an impact load in a substantially normal direction, and wherein the sides are molded to include at least one perforated wall substantially aligned with the normal direction which has at least one stiffness reducing gap; and
in a second shot, injection overmolding a substitution panel using a resilient material having a second durometer less than the first durometer into and closing the gap, wherein the gap and the substitution panel define locking surfaces for retaining the substitution panel, and wherein the combined first and second durometers provide a predetermined collapse in response to the impact load.

12. The method of claim 11 wherein the first and second shot injection molding are performed with a rotary mold.

13. The method of claim 11 wherein the perforated wall is located at a lateral side extending transversely from the front wall.

14. The method of claim 11 wherein the perforated wall is located at the bin bottom extending transversely from the front wall.

15. The method of claim 11 wherein the sides include opposite lateral sides which are each a perforated wall extending transversely from the front wall, and wherein the bin bottom is a perforated wall extending transversely from the front wall.

16. The method of claim 11 wherein the locking surfaces comprise a tongue and groove arrangement wherein the substrate includes a tongue extending along an inner periphery of the gap formed by the first shot, and wherein a matching groove is formed in the second shot by overmolding an outer edge of the substitution panel onto the tongue.

17. The method of claim 11 wherein the first durometer plastic material is comprised of thermoplastic polyolefin.

18. The method of claim 11 wherein the first durometer plastic material is comprised of thermoplastic polypropylene.

19. The method of claim 11 wherein the resilient material is a thermoplastic copolymer.

20. The method of claim 19 wherein the resilient material is vulcanized.

* * * * *